(12) United States Patent
Chien

(10) Patent No.: US 8,083,377 B2
(45) Date of Patent: Dec. 27, 2011

(54) LED LIGHT HAVING PROJECTOR WITH FOCUS ADJUSTMENT

(76) Inventor: Tseng-Lu Chien, Walnut, CA (US)

( * ) Notice: Subject to any disclaimer, the term of this patent is extended or adjusted under 35 U.S.C. 154(b) by 0 days.

(21) Appl. No.: 12/876,507

(22) Filed: Sep. 7, 2010

(65) Prior Publication Data

US 2011/0063587 A1    Mar. 17, 2011

(51) Int. Cl.
*G03B 3/00* (2006.01)
(52) U.S. Cl. .... 362/276; 362/646; 362/800; 362/249.02
(58) Field of Classification Search .......... 362/640–646, 362/249.02, 800
See application file for complete search history.

(56) References Cited

U.S. PATENT DOCUMENTS 7,186,016 B2 *   3/2007   Jao ................................ 362/644

* cited by examiner

*Primary Examiner* — Anabel Ton
(74) *Attorney, Agent, or Firm* — Bacon & Thomas, PLLC

(57) ABSTRACT

An LED light includes focus-adjustable projection means that can be rotated 360 degrees about any desired combination of x, y, and z axes of a three-dimensional coordinate system and powered by any of a variety of AC and DC power sources. Furthermore, the LED light may include multiple adjustable-focus projection means that can be removed from and inserted into compartments at desired locations to project images or light beams to multiple locations as desired.

9 Claims, 10 Drawing Sheets

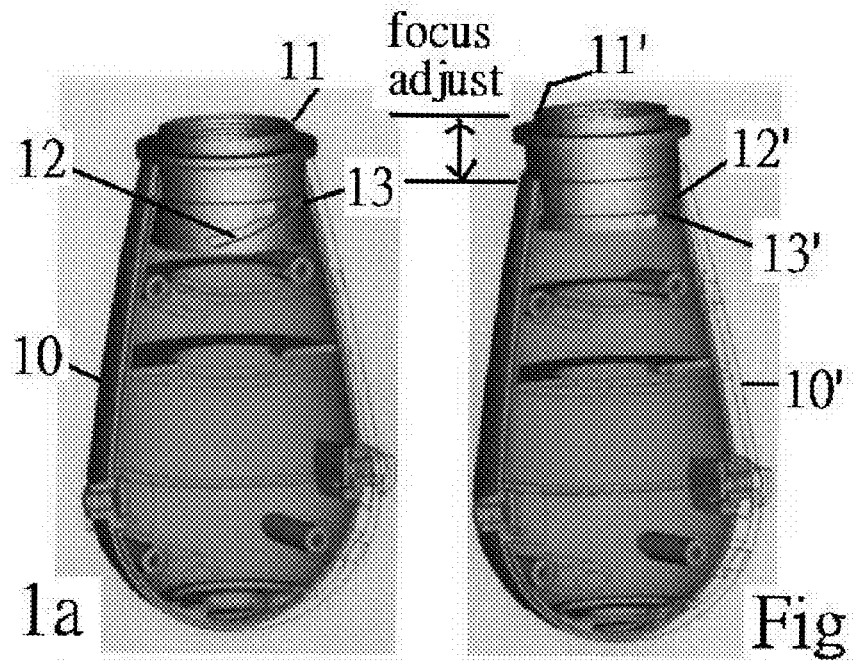
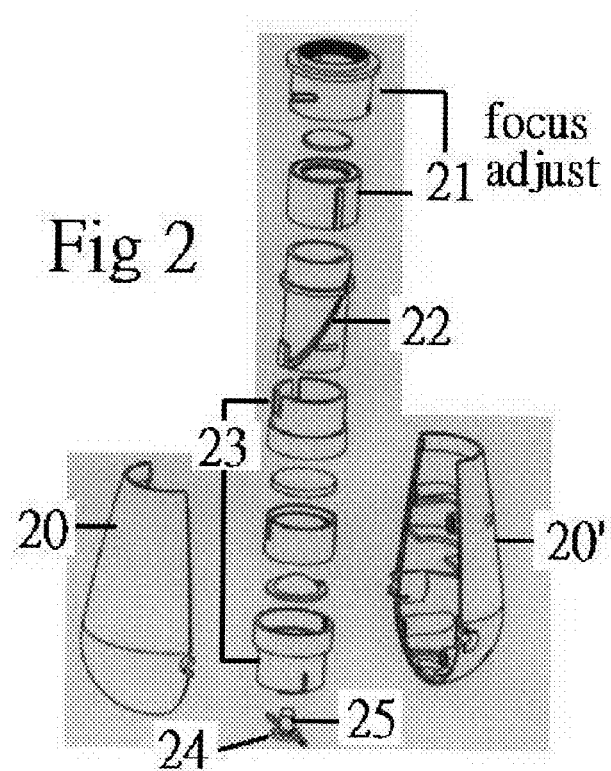

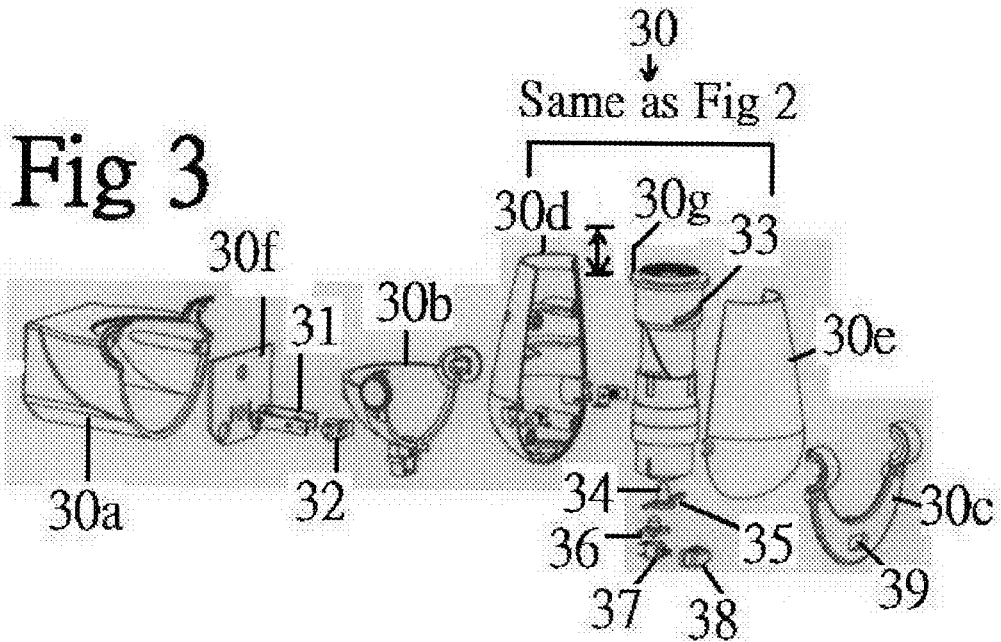
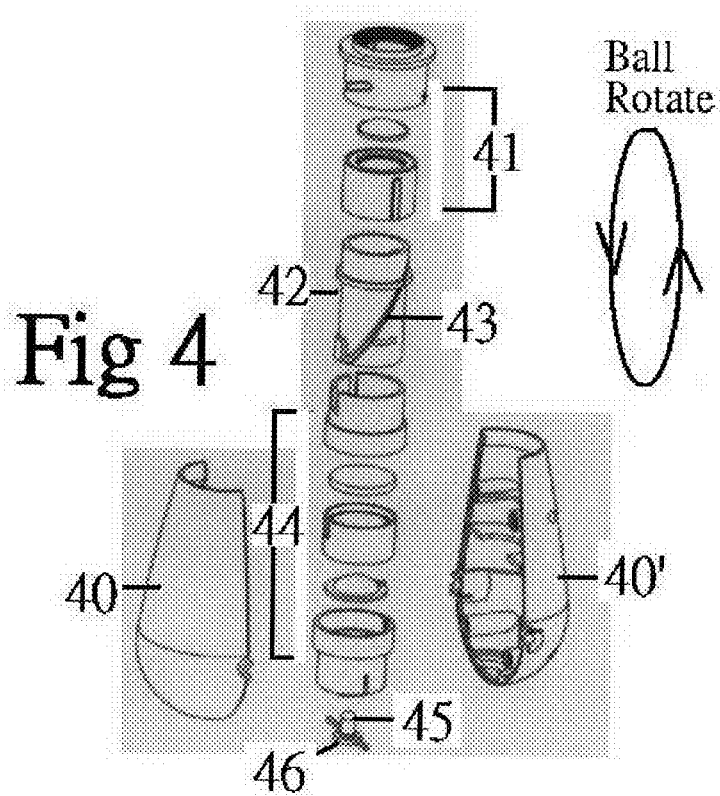

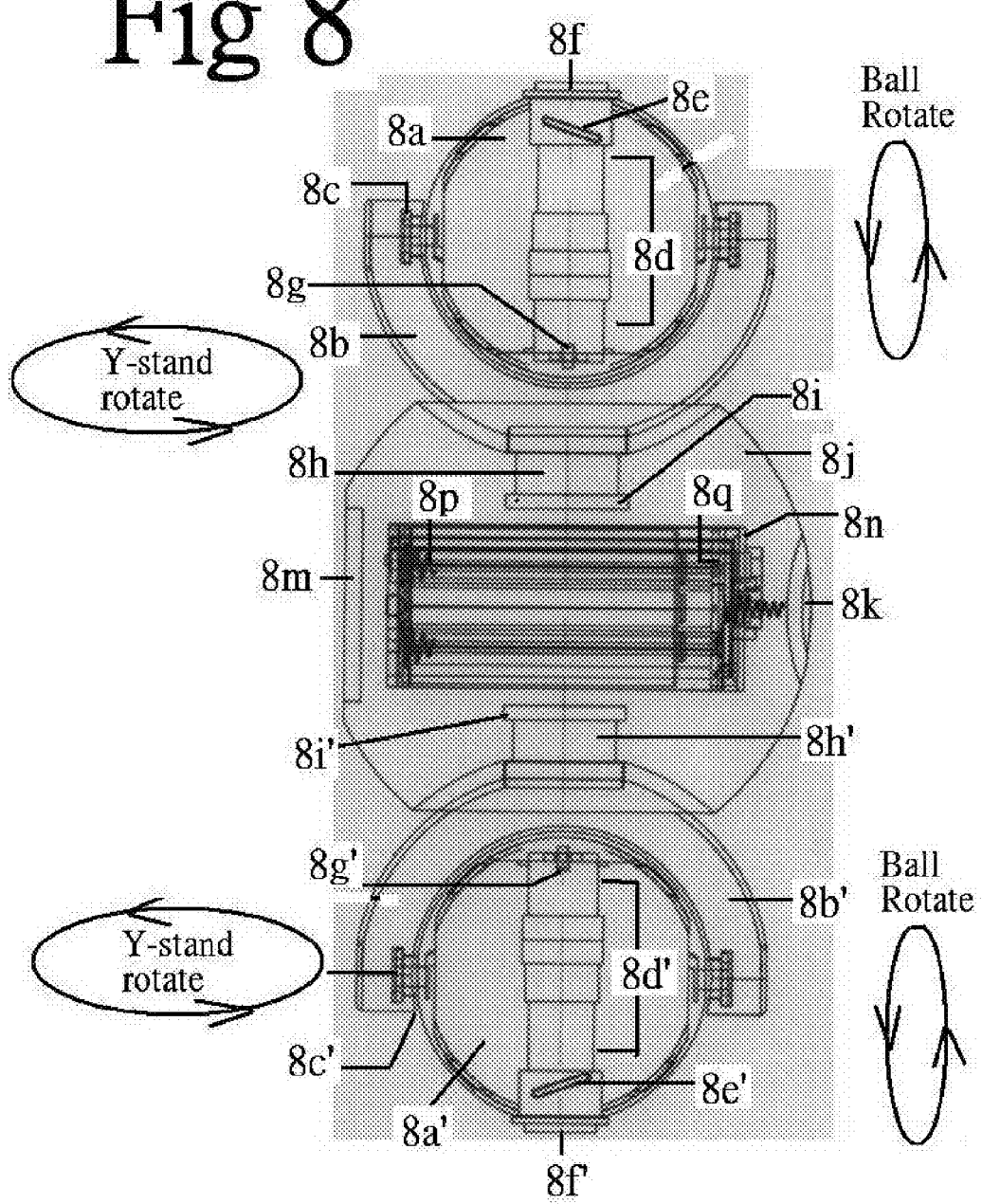

LED LIGHT HAVING PROJECTOR WITH FOCUS ADJUSTMENT

This application has subject matter in common with U.S. patent application Ser. Nos. 12-624,621, 12-622,100, 12-318,471, 12-318,470, 12-318,473, 12-292,153, 12-232,505, 12-232,035, 12-149,963, 12-149,964, 12-073,095, 12-073,889, 12-007,076, 12-003,691, 12-003,809, 11-806,711, 11-806,285, 11-806,284, 11-566,322, 11-527,628, 11,527,629, 11-498,874, 12-545,992, 12-806,711, 12-806,285, 12-806,284, 12-566,322, 12-527,628, 12-527,629, 12-527,631, 12-502,661, 11-498,881, 11-255,981, 11-184,771, 11-152,063, 11-094,215, 11-092,742, 11-092,741, 11-094,156. 11-094,155. 10-954,189, 10-902,123, 10-883,719, 10-883,747, 10-341,519, 12-545,992, 12-292,580, 12-710,918, 12-624,621, 12-622,000, 12-318,471, 12-318,470, 12-318,473, 12-292,153, 12-710,561, 12-710,918, 12-711,456, and 12-771,003.

The present application relates to LED lighting systems that project an image or light beams and include focus adjustable means to enable illumination of both close and remote areas for outdoor or indoor application, and that may utilize optics principles and features disclosed in the above-listed patent applications. The LED lighting systems may, as disclosed in the above-listed applications, be powered by alternating current (AC) or direct current (DC) power sources such as an electric cord and plug for an outlet, a battery, a transformer, a solar power source, or any other suitable power source. In addition, the LED lighting systems of the invention may utilize, as disclosed in the above application, more than one light source, more than one function, more than one optics means, and/or more than one projection means with additional power cost saving features.

BACKGROUND OF THE INVENTION

There are a number of commercially-available simple hand held toys with projection means, but in which the projection means cannot be rotated along any combination of the x-axis, y-axis, z-axis. The reason is that such a design is too complicated and will be immediately damaged by kids, so the toys normally have no rotating features at all. In addition, very few of the commercially-available toy projection devices have focus adjustable means because such focus adjustment means are also too easily damaged by kids.

Also commercially available are desk top or similar projection lights that project an image or light beam to certain areas and that normally use battery power so that they can fit on any location, such as a bed in the case of the Fisher-Price® projection light. However, unlike the projection light of the present invention, the prior desk top type projection lights cannot use different power sources, rotate more than 180 degrees in both vertical and horizontal directions to project an image or light beams to any desired location, or include an adjustable focus to change the focus, size, brightness, clearance, and/or sharpness of the projected image or light beams.

Accordingly, the current invention seeks to make a big improvement over conventional LED lights by enabling rotation of the projection means and by providing focus-adjustable means, the LED light being powered by a home electricity power source, battery power source, or another power source to provide an LED light device capable of illuminating a variety of different areas while offering cost saving and the ability to adjust brightness, image location, color, size, clearance, and/or pixel quality of the image.

The inventor has filed copending applications, including U.S. patent appl. Ser. No. 12-624,621 and 12-771,003 that also disclose LED projection lights with adjustable focus means to cause the image or light beam to project to desired area(s), and which uses prongs to connect to a wall power source such the North American of 120 Volt, 60 Hz AC line power through an adaptor and/or transformer.

As in the copending applications, the LED light of the present invention projects the image or light beams through focus adjustable means built-into each project means to easily change the clearance, sharpness, size, and brightness of the projected image or light beams.

However, the LED light of the current invention also includes a special projection means arrangement which may include multiple projection means that can change position at any time and that can also be fixed at desired locations, so as to enable illumination of multiple areas without the need to buy more than one LED light device.

Thus, the current invention represents an improvement over the adjustable-focus projection means of co-pending U.S. patent appl. Ser. No. 12-771,003, in which a plurality of projection means are provided in one geometric-unit but are pre-designed can only be adjusted in limited dimensions (2 dimensional) such as x-y or x-z or y-z axis. The current invention allows people to change the position to any location along the x-y-z axes to cover a whole three-dimensional range so that one LED light with position-changeable special projection means can satisfy a greater range of illumination needs for less money. The current invention thus offers people (1) more than one projection means on one LED light; (2) the ability to illuminate desired locations and more than one illuminated-areas by simply changing position of individual projection means; (3) the ability for persons to provide any number from one to N number of special projection means by adding to or reducing the number as required, and (4) the ability to use any power source including not only a wall outlet, but also a battery, solar energy, an adaptor, or even waterpower.

The current invention may also include any of the following features disclosed in the above-cited patent applications of the inventor:

A. The LED light device may use the more than one optics means described in U.S. patent appl. Ser. No. 11-806,284, in which LED elements are incorporated with optics media to cause the LEDs to provide an area light illumination effect to act as a night light.

B. The LED light device may also use the multiple light sources described in U.S. patent appl. Ser. No. 11-255,981, in which multiple LED elements are arranged in a matrix shape to face in one or multiple directions, and/or to have different positions, orientations, or locations to be seen by viewers, some of the LEDs serving as a night light and some as an emergency light.

C. The LED light device may also, as described in U.S. patent appl. Ser. No. 11-255,981, include first and second LED elements each having a plurality of LEDs that face in more than one direction, or that are at different locations, positions, or orientations, to illuminate multiple areas.

D. The LED light device may include one of mechanical or electric switches having at least one function selected from on, off, auto, timer, time delay, flashing, partial on, partial off, partial flashing, partial chasing, partial random, partial fade-in and fade-out, on/off blinking function duration, power saving selection, blinking function selection, persistence of vision effects, percentage of each blinking cycle, power saving setting or selections, LED group reset selections or any LED light functions for a plurality of LEDs that is available from the marketplace.

E. The LED light device may also, as disclosed in U.S. patent appl. Ser. No. 11-806,285, include LEDs of any type or LED specification with single color or multiple colors, the color, and number of illuminated LEDs being changeable, to provide different light functions under control of a switch or sensor means.

F. The LED light device may also, as disclosed in U.S. patent appl. Ser. No. 11-806,285, incorporate other functions selected from an outlet, air freshener, motion sensor, beacon light, warning light, chasing lights, flash light, bug repelling device, mosquito repelling device, mouse repelling device, sonic pest repelling device, or persistence of vision device.

G. Still further, the LED light device may, as disclosed in U.S. patent appl. Ser. No. 11-255,981, Include an LED or LEDs for indicating the battery status, including low battery capacity. full capacity, or half capacity with preferred colors indicating the status of the batteries, or the duty status of the light device.

H. The LED light device may also use the special effects described in the patent application entitled "LED Device Has Special Effects" filed on Feb. 25, 2010, in which the LED is caused to flash faster than the human eye response time of 1/24 to 1/16 second to cause the illumination provided by the flashing LED to appears to be steady due to the persistence of vision effect and let the people see a continuous light beam while reducing power consumption of the batteries.

I. The LED light device may, according to the above-described persistence of vision effect, have an on time of 1/48 second, achieved by flashing at a frequency of 48 Hz, or by having an appropriate on/off duty cycle percentage, selectable by a power saving setting or selection, or by an LED group reset selection.

J. In addition, of the LED light device may be arranged to have a voltage higher than the LED trigger voltage, or a voltage that is lower than the LED trigger voltage with the voltage being increase by an electric circuit that raises or boosts the battery voltage up to the LED trigger voltage.

K. For example a preferred LED light device with power saving features May include:
at least one LED to provide a light source.
at least one housing having space to install any of the following: circuit means, conductive means, electric components parts and accessories, switch means, sensor means, an integrated circuit (IC), and a micro controller to connect with a power source to cause the LED to turn on and off to achieve a predetermined function, effects, on/off duration, duty cycles, color, and/or brightness; and with power saving features being achieved by using control means to control the LED's turn-on and turn-off duration time for a certain percentage of each cycle, at a rate that takes advantage of the persistence of vision effect of the human eye, which has a response time of within 1/24 to 1/16 second.

L. An LED light device of the type described in part K may also include cost saving features achieved by using batteries which have a total voltage that is less than the LED's trigger voltage and voltage increasing electric components, parts, and accessories to make lower batteries' voltage raise-up to over the LED or LEDs trigger voltage.

BRIEF DESCRIPTION OF THE DRAWINGS

FIGS. 1a and 1b are front views showing a first preferred embodiment of the current invention, in the form of an LED light with focus adjustable means for a projection means.

FIGS. 2 and 4 4 are exploded isometric view of the LED light illustrated in FIGS. 1a and 1b.

FIG. 3 is an exploded isometric view of the LED light of the first preferred embodiment with a rotating ball wall adapter.

FIGS. 7 to 7-3 are front views showing a third preferred embodiment of the invention in which the multiple axis mount of FIGS. 5 and 6 is adapted for various different applications.

FIG. 8 is a front view of an adjustable focus projection light with adjustable focus according to a fourth preferred embodiment of the invention, with projection means each rotatable over 360 degrees about multiple axes.

DETAILED DESCRIPTION OF THE PREFERRED EMBODIMENTS

Figure 5:
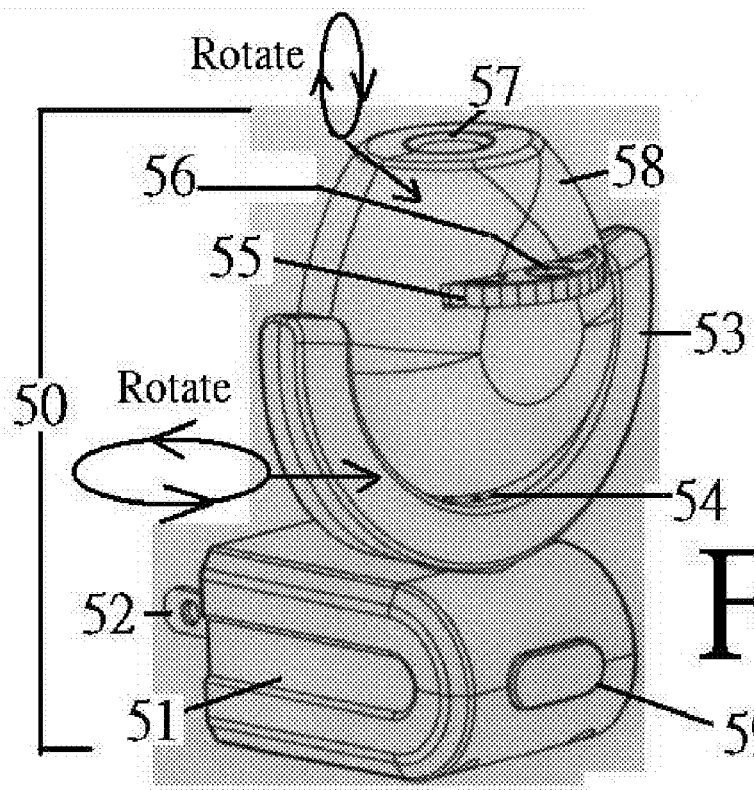
FIGS. 5 and 6 are respective isometric and exploded isometric views of an adjustable-focus LED projection light according to a second preferred embodiment of the invention that has a plurality of display-units and a wall adapter that enables rotation around both vertical and horizontal axes.

The various embodiments of the LED projection light of the current invention preferably have in common the following features or characteristics:

1. The projection means can be rotated 360 degree about any desired combination of the x-axis, y-axis, or z-axis of a three-dimensional coordinate system so as to project the desired image or light beam to any location (unlike, for example, conventional hand-held projection toys).

2. The projection means can have an adjustable focus so as to project an image through a film, screen, LCD, photos, stencil, indicia, or time display, the projected image having a different clearance, sharpness, brightness, and/or size as required for selected illuminated-areas.

3. The projection means has a changeable location on the LED light which allows inclusion of more than one projection means on one LED light so as to illuminate more than one area by simply changing position of the projection means or by adding or reducing the number of projection means, with power preferably being supplied by any of a wall outlet, battery, solar power source, adaptor, or even water power source, by way of example and not limitation.

The inventor's copending U.S. patent application Ser. Nos. 12/003,809 and 12/073,889, and issued U.S. Pat. Nos. 7,726, 841, 7,726,839, and 7,726,869 disclose various LED light devices with multiple light units whose position, orientation, spacing, and so forth can be changed. The preferred embodiments of the present invention use some of the structures disclosed in the copending applications and patents, but applies them to the above mentioned focus-adjustable LED projection light.

As shown in FIG. 1a, a focus adjustable projection means cover (11) includes a groove (12) into which extends a raised-pole (13) extending from light device housing (10), allowing the cover (11) to move axially while being rotated by a user.

FIG. 1a shows the cover in a lower position and FIG. 1b shows the cover in a top position defined by a lower end of the groove (12') (with the raised-pole in FIG. 1b being indicated by reference numeral (13')). The cover (11) includes a lens and/or other optics means so that axial movement of the cover will change the length of the projection means and change the focus of an image projected through a film, screen, LCD, photos, stencil, indicia, or time display, to provide different image clearance, sharpness, brightness, and/or size as required for different illuminated-areas. Of course, the mechanism by which the focus is adjusted may be varied in numerous ways, and any similar skill, equivalent method, or alternative arrangement to get the focus changes will still fall within the scope of the current invention.

Figures 1, 2, 3, 7:
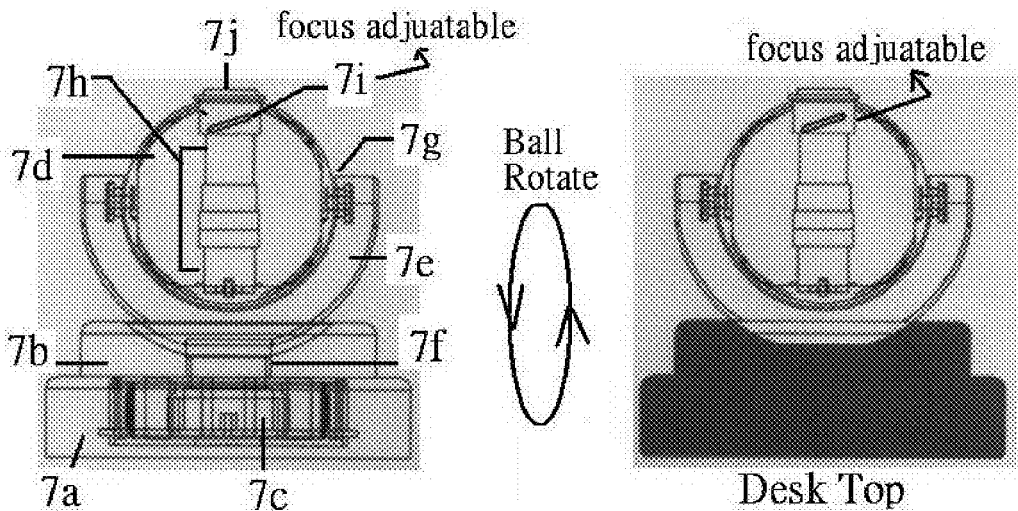

FIG. 2 shows details of the first preferred embodiment, which has s focus adjustable assembly (21) that corresponds to the one shown in FIGS. (1a) and (1b). The lower tubular parts and accessories (22) and optics-means/lens assembly (23) may be selected to meet the requirements of particular applications, and can include any one or more of the following: optics means, a lens, a film, an image carrying medium, an LCD screen, a stencil, cartoon characters, indicia, tubular means or a tube, an opening, and light block out means with a catch or snap-fit arrangement to prevent light beams from leaking out. The housing (20) and (21) seals the whole projection assembly within.

FIG. 3 shows further details of the first preferred embodiment, the projection assembly and housing (30) being the same as those of FIG. 2 and sealed by front cover (30c) and middle housing (30b). The circuit (300, prong means (31), and switch (32) are sealed within the middle housing (30b) and back housing (30a).

From FIG. 4 shows exactly the same arrangement as FIG. 2, but with an indication of the rotation direction provided by the pivotal housing elements (middle housing 30b and front cover 30c) shown in FIG. 3, which enable pivoting of the adjustable focus projection unit relative to the back housing (30a).

Figure 6:
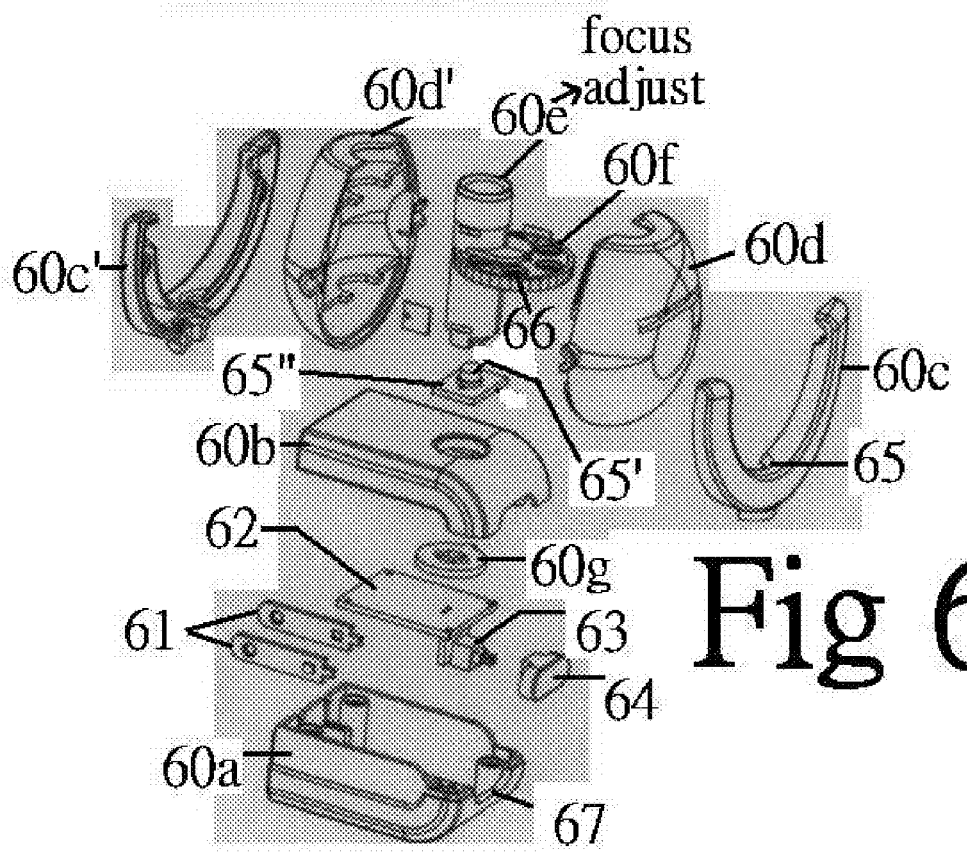

FIGS. 5 and 6 show a second preferred embodiment having a plurality of display-units (each of which may include a film, screen, time display, stencil, picture, or other optics element through which light beams are projected) and a printed circuit board with any of the following electrical components: conductive means, sensor means, switch means, color selective means, switch, motion sensor, and function switch, as well as an optics lens construction which has Y-shaped stand to enable 360 rotation about a horizontal axis and 360 degree rotation about a vertical axis.

As shown in FIGS. 5 and 6, LED light (50) includes a housing (51) that contains all circuitry, switch means, and sensor means (not shown) with a switch cover (59) on front of the housing (51) and prong means (52). The housing (58) houses a projection means (57) having a plurality of display-unit(s) (56) on a wheel (55) which can be rotated to change the display-unit(s) (56) to cause different images to be projected to a desired surface. the wheel (55) may have 4, 6, 8, 10, 12 or any number of display-unit(s) (56). The display-unit(s) may include, as indicated above, any image carrying medium, a time indicator, a screen, indicia, stencils, an LCD screen, or film through which light beams pass to project the image, as described in the above-cited copending applications. Uniquely, the housing (58) is held by a "Y"-shaped stand (53) which enables the housing (58) to rotate 360 degrees about a horizontal axis, the "Y-stand" (53) itself being rotatable 360 degrees about a vertical axis so that the projection means (57) can project the image or light beams to any desired location.

FIG. 7 shows an alternative LED light unit which can be installed on a variety of surfaces. The LED light has focus-adjustable projection means (7j) with a groove (7i) and projection assembly (7h) inside a housing (7d) installed on a Y-Stand (7e). The Y-stand (7e) is installed on a top base (7b) by a neck (70 that fits into a top base hole (not shown). The base compartment (7a) can receive any kind of power source a wall outlet adapter, a battery, a transformer, a chemical power source, a water power source, a solar power source, a generator, or any known energy storage devices.

FIGS. 7-1 shows the LED light of this embodiment installed on a desk top and powered by an adaptor, transformer, or battery with focus-adjustable projection means and a Y-stand that permits rotation of the projection means about an x-axis, y-axis, and/or z-axis of a three-dimensional coordinate system.

FIGS. 7-2 shows the LED light of this embodiment installed as an under-cabinet light fixture powered, for example, by an adaptor, transformer, or battery with focus-adjustable projection means and a Y-stand of the type shown in FIG. 7-2.

FIGS. 7-3 shows the LED light of the embodiment of FIG. 7 installed as a wall light which may be powered in the same manner as the LED lights of FIGS. 7-1 and 7-2, with focus-adjustable projection means supported by a corresponding Y-stand.

FIG. 8 shows an LED light with two projection means (8a) (8a') in top and bottom positions. The focus-adjustable projection means (8f+8e) (8f'+8e') with their projection assemblies (8d) (8d') are sealed within the housings (8a) (8a') and install on a respective Y-stand (8b) (8b'). The necks (8h) (8h') of the Y-stands (8b) (8b') are inserted into a main body's hole with a holder plate (8i) (8i') to enable the Y-stand (8b) (8b') to freely rotate over 360 degrees about a vertical axis. Main housing (8j) has a sensor (8k) to act as a switch means and turn on an inner circuit means, and an IC means to deliver electric signal through conductive means to the LEDs (8g) (8g') to project display-unit images or light beams to desired locations. The power source may be any power source selected from, for example, a wall outlet, battery, adaptor, transformer, chemical power source, water power source, solar power source, generator, or any known energy storage devices. The cover (8m) can be easily opened and closed as necessary.

Figure 9:
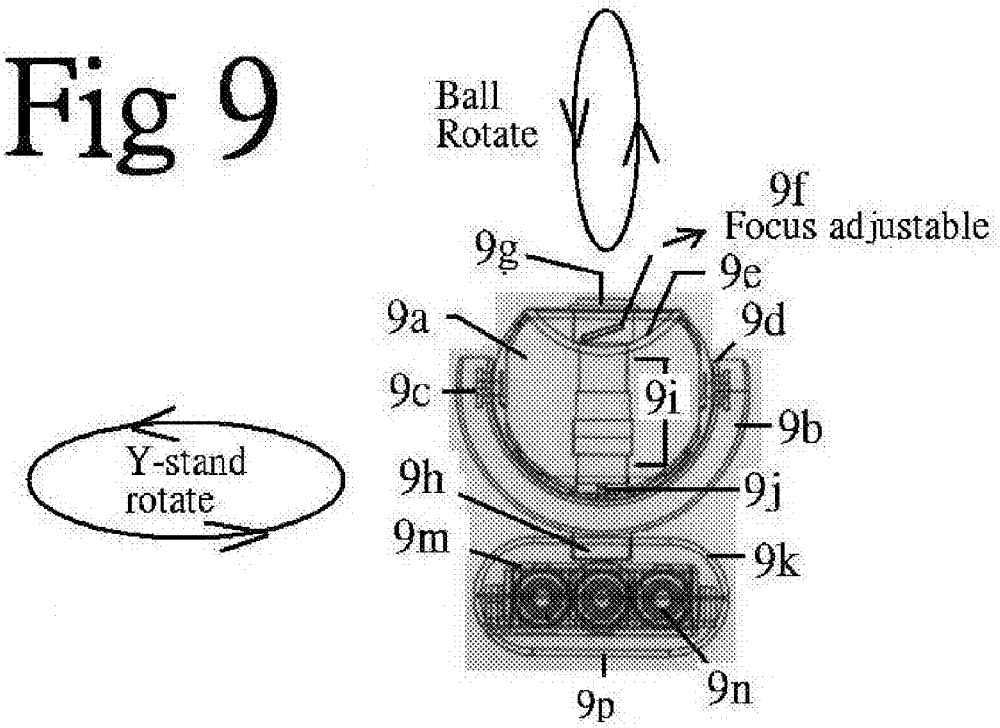
FIGS. 9, 9-1, 10, 11, and 12 front and isometric view of adjustable focus LED projection lights according to fifth and sixth embodiments of the invention, including features disclosed in copending U.S. patent application Ser. Nos. 12/003, 809 and 12/073,889 and issued U.S. Pat. Nos. 7,726,841, 7,726,839, and 7,726,869, but with focus adjustable features.
Figures 1, 9:
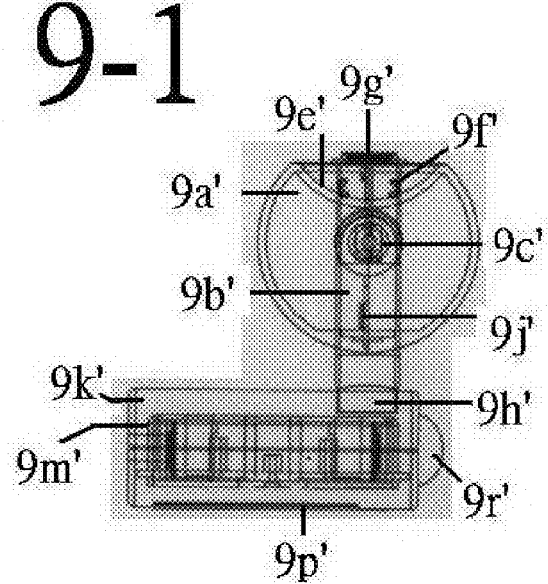

FIGS. 9 and 9-1 show LED light units that are similar to that of FIG. 8 and other figures but with a different shape and design for the housing (9a), which has a spherically concave surface (9e) so the projection means can be adjustable over a longer length within the housing (9a) and recess in top surface (9g) so that the projection means will have a much bigger range of focus adjustability.

Figure 10:
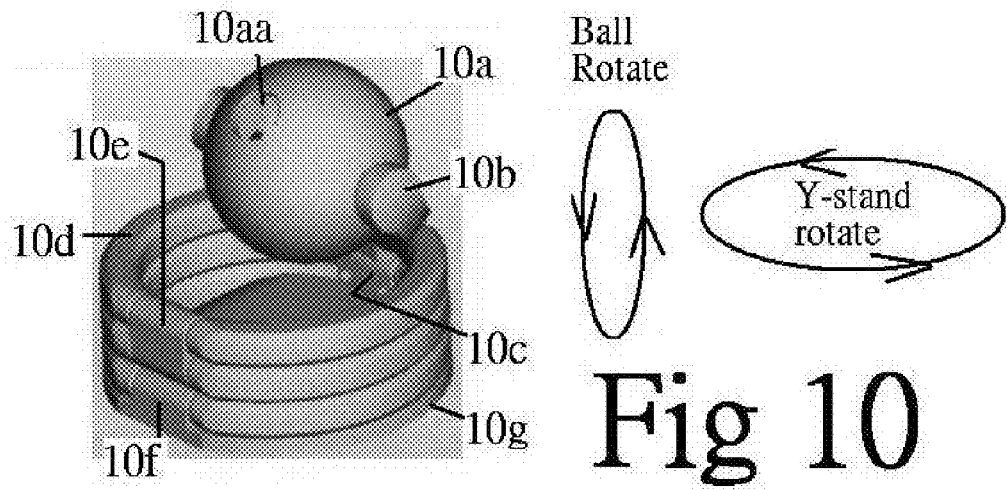
Figure 11:
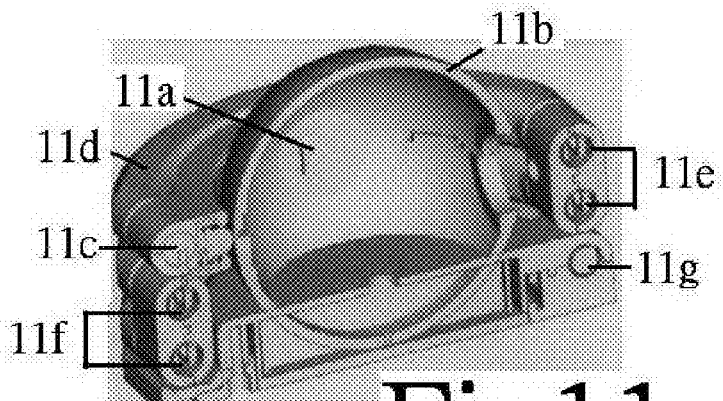
Figure 12:
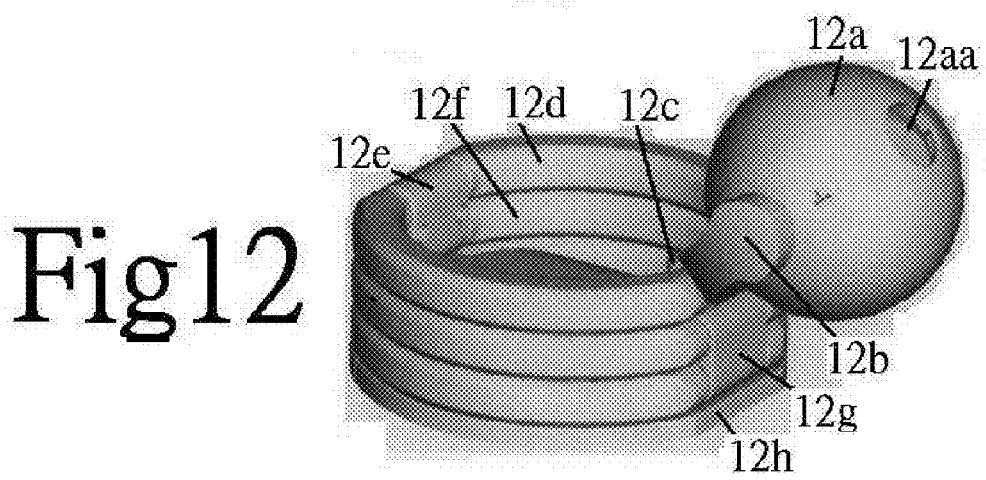

FIGS. 10, 11, and 12 show fifth and sixth preferred embodiments which act as reading light, desk top light, under-cabinet light, all purpose light, security light, power fail light, AC operation light, or DC operation light for outdoor or indoor applications, and which may also be used as a sensor light, emergency light, or evacuation light, or as a multiple function night light with added focus-adjustable projection means. The LED light of FIGS. 10, 11, and 12 may further include extendable arms to enable the projection means and LED light to be extended or bent to a desired position in a manner similar to the extendable light devices disclosed in the inventor's copending U.S. patent application Ser. Nos. 12/003,809, 12/073,889 and issued patents 7,726,841, 7,726,839, and 7,726,869 but with focus-adjustable features. As a result, the LED light can become a reading light, desk top light, ceiling light, or multiple purpose light because the light beams can be focused on small areas or big areas of a wall, the ground, and other locations.

As shown in FIG. 10, project means (10aa) is installed on a ball (10a) and ball (10a) is installed on the Y-stand (10b). The ball (10a) can be freely rotated about the vertical-axis and horizontal-axis, so that the projection means can project an image or light beams to any desired location. The Y-stand (10b) is connected with joint (10c), which is connected with ring (10d). Ring (10d) is connected with another ring by joint (10e) and passes electric signals from the lower ring to the ring (10d), and then to joint (10c),-Y-stand (10b), and then to the LED of projection means (10aa). The joints and electric delivery means can be seen more clearly in FIG. 11, which shows that the base is connected with the middle ring by the joint (11f) via two channels, one for positive electric voltage and one for negative electric voltage. The middle ring delivers the electric signal to the upper ring by means of joint (11e) with two electric signals through the two channels of joint (11e). Hence, the power source can be any kind of power source as discussed above, and can be situated on the base ring so the weight will fall on the base and enable the top rings and ball to be bent and fixed in any desired orientation without falling down. The electricity can alternatively be delivered, as shown in FIG. 12, from base (12h) to ring (12c) to joint (12g) to ring (120 to joint (12e)→ring (12d) to Y-stand (12b), and finally to Ball (12a). There are numerous known ways to deliver electricity between the sections, and all such ways are intended to fall within the current scope of invention.

Figure 13:
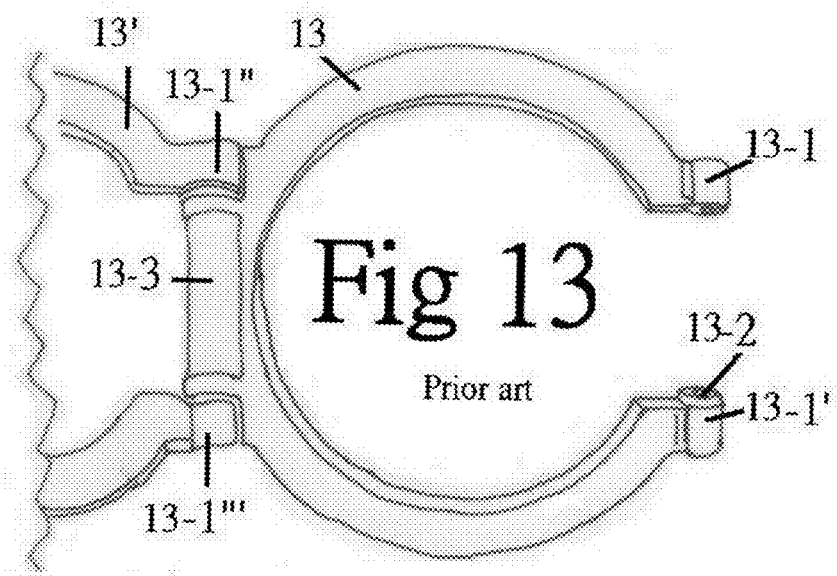
FIGS. 13 and 14 show commercially available frames that can be used in connection with the adjustable-focus LED lights of the preferred embodiments.
Figure 14:
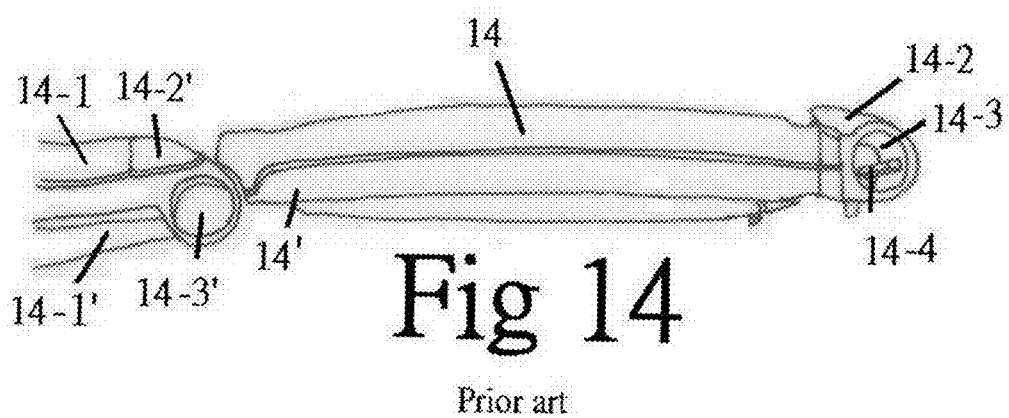

FIGS. 13 and 14 show an alternative arrangement for connecting multiple sections. FIG. 13 shows a ring (13) and (13') connected by an ear (13-1") and bar (13-3). The ring's opening end forms the ears (13-1) and (13-1'), which are separated by a center channel. FIG. 14 shows the channel's inner design, in which one orientation-alignment bar (14-4) is situated inside the channel to enable fixing of the receiving-bar (14-1) on the orientation-alignment bar and prevent the receiving-bar (14-1) from rotating within the channel (14-3). This arrangement can be used in the preferred embodiments even when the power source is not on the base to serve as a counterweight.

Figure 15:
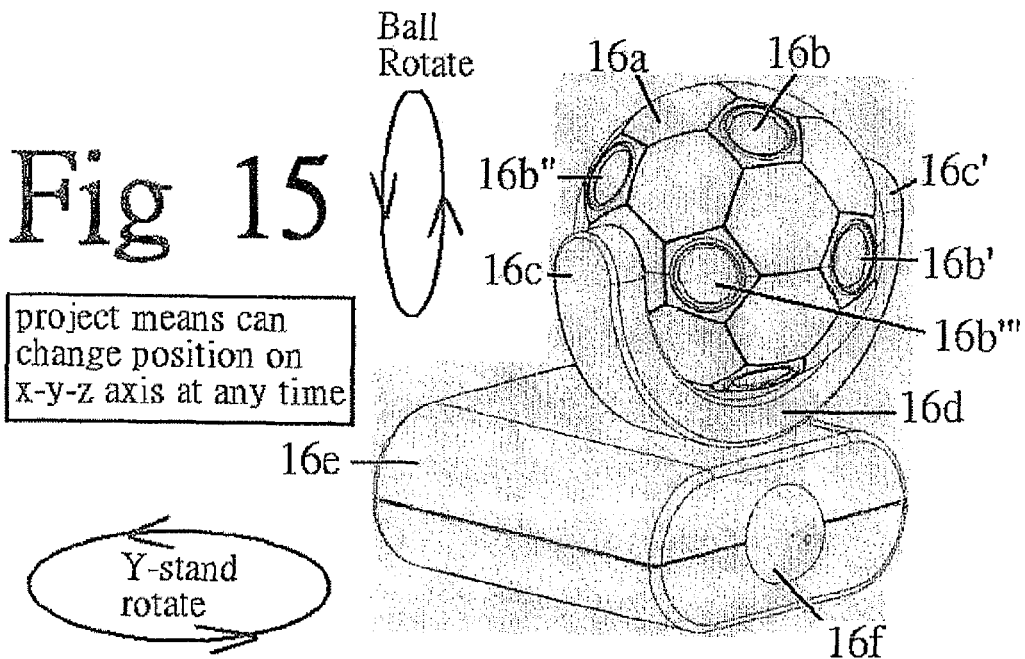
FIGS. 15-18 are isometric views showing the LED projection light of a seventh preferred embodiment that can use multiple different types of power source, and that includes multiple special projection units that may be removed and replaced by a user.

FIGS. 15-18 show an important improvement over the projection lights of the inventor's copending applications, in which the LED light includes multiple changeable special projection means. FIG. 15 shows a ball (16a) having five compartments that can each accommodate either a special projection means or a fake (dummy) projection means. The individual projection means, and the mounting of the ball, may be the same as in above-described embodiments.

Figure 16:
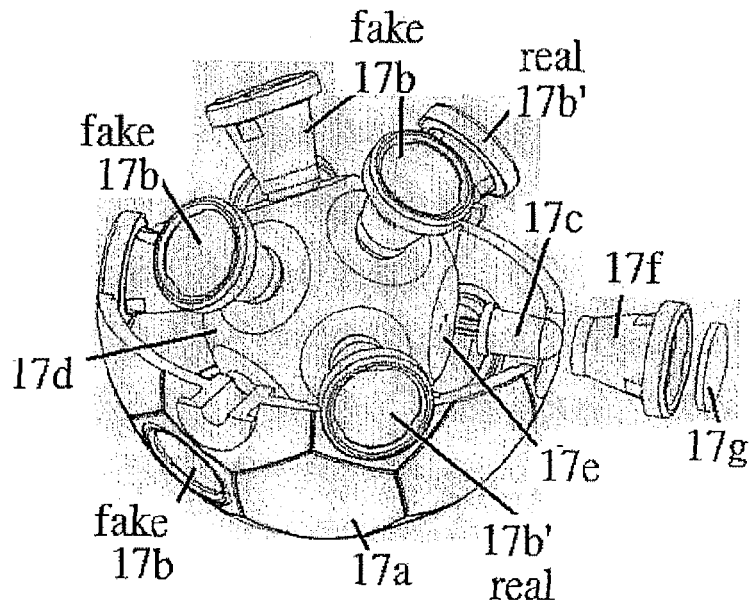
Figure 17:
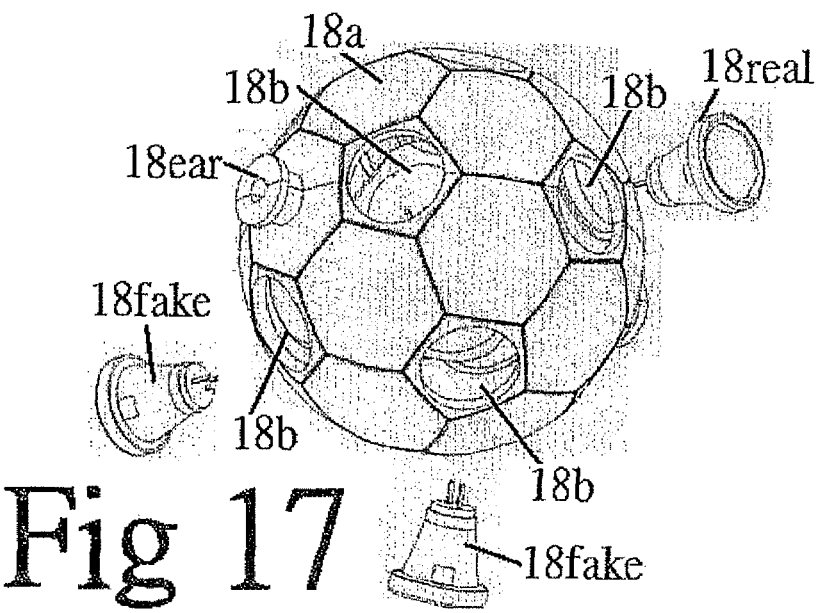
Figure 18:
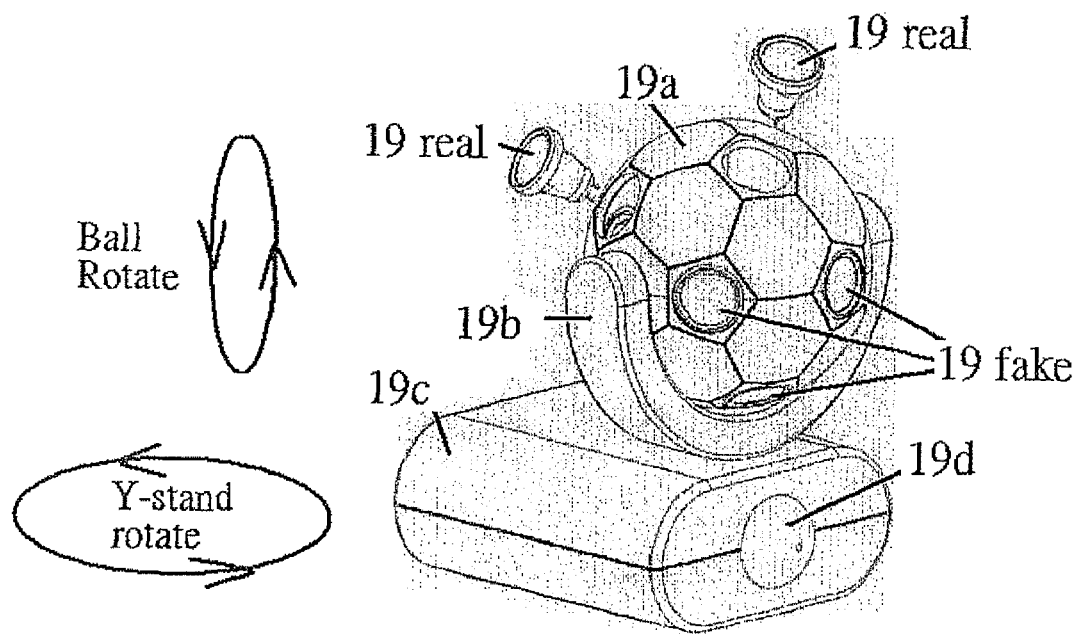

FIG. 16 shows construction of the ball (16a) of FIG. 15, in which inner conductive means (17e) are provided to enable the user to easily make electric connection with the LED's terminals (17c) and cause the LED to emit light to achieve a predetermined light performance. The real projection means (17b') each have a built-in LED light means (17c) and projection-unit (17f) with an optics lens (17g) and LED terminals to make electric connection with the inner conductive-means (17e). The real projection means (17b') can be easily pulled-out or inserted-into the ball's compartments (16b) (16b') (16b") (16b'") and make electric connection at once. At the same time, fake projection means (17b) can also be pulled-out or inserted into the ball's compartments when the respective compartments do not have a real projection-means. The fake projection-means is designed to meet safety concerns because authorities require that all electricity-carrying parts be covered so that they cannot be touched, the fake project-means (17b) being provided to cover all empty compartments that do not contain a real projection means (17b'). The number of real projection means (17b') can be increased or reduced by people simply by pulling them from or inserted them into the compartments. All of the compartments are well designed to provide the whole ball's surface with a good arrangement so all real projection means can be installed in a most satisfactory manner by any consumer to offer the best location and arrangement for different environments, spaces, or rooms, such as a kitchen, under-cabinet, garage, garden, playground, patio, bus, boat, aircraft, or vessel, both indoors and outdoors, for use as a reading light, safety light, emergency light, all purpose light, working lamp, garden light, bike light, automobile light, traffic light, or workzone light, and powered by all kinds of available power sources. No existing LED light can let the consumer arrange the light or image projection location in so many ways.

Although preferred embodiments of the invention have been described in detail, numerous variations of the details of the construction are possible, for example with respect to the delivery of electricity from one section to another, and all variations, methods, solutions, equivalent functions and so forth should still fall within the current scope of invention.

The invention claimed is:

1. An LED light arranged to accommodate a plurality of special projection assemblies, comprising:
    at least one projection assembly, wherein each said at least one projection assembly includes a projection assembly housing, at least one LED, an electrical connector, and circuitry for connecting the LED to the electrical connector, said circuitry including one or more of the following electrical components: a sensor, a switch, conductors, and an integrated circuit, said projection assembly housing further containing an image carrying medium, screen, indicia, time display, stencil, LCD screen, or film through which light beams are transmitted from the LED, and a focus adjustment means for adjusting a focus of a projected said image or light beams to provide a desired image clearance, sharpness, size, or brightness;
    an LED light housing including a plurality of compartments each arranged to receive one said projection assembly, said compartments including mating electrical connectors for establishing an electrical connection with the electrical connector of the projection assembly when the projection assembly is inserted into the compartment, thereby enabling users to change a number of projection assemblies in said LED light by selectively inserting and removing projection assemblies from respective compartments;
    a power source connected to said electrical connector of said LED light and selected from any of a wall outlet plug, battery, adaptor, transformer, chemical power source, water power source, solar power source, generator, or another energy storage device; and
    at least one fake projection assembly arranged to fit into said compartments when said projection assembly has been removed, to prevent a user from touching electricity-carrying parts in said LED light housing.

2. An LED light having focus-adjustable projection means for projecting an image or light beams, said focus-adjustable projection means including an image carrying medium, screen, indicia, time display, stencil, LCD screen, or film through which light beams are transmitted from the LED, and a focus adjustment means for adjusting a focus of a projected said image or light beams to provide a desired image clearance, sharpness, size, or brightness;

at least one LED and circuitry for connecting the LED to a power source, said circuitry including one or more of the following electrical components: a sensor, a switch, conductors, and an integrated circuit, and said power source selected from any of a wall outlet plug, battery, adaptor, transformer, chemical power source, water power source, solar power source, generator, or another energy storage device;

means for mounting said projection means to rotate a desired number of degrees around any combination of axes in a three-dimensional coordinate system to project said image or light beams to a desired location; and fixing means for fixing the LED light to a desired surface.

3. An LED light as claimed in claim 1 or claim 2, wherein said circuitry includes a power saving IC or battery voltage raising circuit.

4. An LED light as claimed in claim 1 or claim 2, wherein said circuitry includes said sensor or switch, and said sensor or switch is any commercially available sensor or switch.

5. An LED light as claimed in claim 1 or claim 2, wherein said focus adjustment means has a focal range that extends from wide angle to telescoping.

6. An LED light as claimed in claim 1 or claim 2, wherein said projection assembly or projection means includes optics means selected from a lens, tubular optics means, light block means, a variety of display units, means for installing said optics means, and conductors to enable said image or light beams to be seen by a viewer with desired clarity, size, or sharpness.

7. An LED light as claimed in claim 1, wherein said LED light housing is rotatable a desired number of degrees around any combination of axes in a three-dimensional coordinate system to project said image or light beams to a desired location.

8. An LED light as claimed in claim 2 or claim 7, wherein said number of degrees is up to 360 degrees.

9. An LED light as claimed in claim 1, wherein said compartments are arranged to facilitate easy assembly and removal of said projection assembly and said fake projection assembly to and from said compartments.

\* \* \* \* \*